US006696378B2

(12) United States Patent
Gibson et al.

(10) Patent No.: US 6,696,378 B2
(45) Date of Patent: Feb. 24, 2004

(54) FLUID CATALYTIC CRACKING CATALYST MANUFACTURING PROCESS

(75) Inventors: Clark W. Gibson, Bainbridge, GA (US); Mitchell J. Willis, Bainbridge, GA (US); George E. Gantt, Milledgeville, GA (US); Robert E. Barnes, Savannah, GA (US); David M. Stockwell, Middlesex, NJ (US)

(73) Assignee: Engelhard Corporation, Iselin, NJ (US)

( * ) Notice: Subject to any disclaimer, the term of this patent is extended or adjusted under 35 U.S.C. 154(b) by 74 days.

(21) Appl. No.: 09/942,971

(22) Filed: Aug. 31, 2001

(65) Prior Publication Data

US 2003/0050181 A1 Mar. 13, 2003

(51) Int. Cl.[7] .................................................. B01J 29/06
(52) U.S. Cl. ............................. 502/79; 502/64; 502/65; 502/68; 502/73
(58) Field of Search ............................. 502/64, 65, 68, 502/73, 79

(56) References Cited

U.S. PATENT DOCUMENTS

| | | |
|---|---|---|
| 4,493,902 A | 1/1985 | Brown et al. .................. 502/65 |
| 4,581,340 A | 4/1986 | Himpsl et al. |
| 4,606,813 A | 8/1986 | Byrne et al. |
| 4,628,042 A | 12/1986 | Speronello |
| 4,631,262 A | 12/1986 | Altomare |
| 4,965,233 A | 10/1990 | Speronello |
| 5,023,220 A | 6/1991 | Dight et al. |
| 5,071,539 A | 12/1991 | Hayward et al. |
| 5,234,578 A | 8/1993 | Stine et al. |
| 5,243,121 A | 9/1993 | Madon et al. |
| 5,300,469 A | 4/1994 | Deeba et al. |
| 5,316,656 A | 5/1994 | Pellet et al. |
| 5,358,632 A | 10/1994 | Hedrick |
| 5,384,041 A | 1/1995 | Deeba et al. |
| 5,395,809 A | 3/1995 | Madon et al. |
| 5,413,978 A | 5/1995 | Kramer |
| 5,462,652 A | 10/1995 | Wegerer |
| 5,521,133 A | 5/1996 | Koermer et al. |
| 5,559,067 A * | 9/1996 | Lerner et al. .................. 502/68 |
| 5,662,868 A | 9/1997 | Letzsch et al. |
| 5,766,558 A | 6/1998 | Letzsch et al. |
| 5,976,355 A | 11/1999 | Johnson et al. |
| 5,993,645 A | 11/1999 | Madon et al. |
| 6,004,527 A | 12/1999 | Murrell et al. |
| 6,010,618 A | 1/2000 | Lomas |
| 6,045,688 A | 4/2000 | Ruottu et al. |
| 6,063,263 A | 5/2000 | Palmas |
| 2002/0115556 A1 * | 8/2002 | Stockwell et al. ............ 502/63 |

FOREIGN PATENT DOCUMENTS

WO  WO 02/24329 A2  9/2001

OTHER PUBLICATIONS

"The Role of Porosity in the Cracking Selectivity of FCC Catalysts," by Stockwell, Engelhard Corp., Mar. 2000.

* cited by examiner

Primary Examiner—M. Alexandra Elve
Assistant Examiner—Christina Ildebrando
(74) Attorney, Agent, or Firm—Raymond F. Keller

(57) ABSTRACT

An in situ process for making improved zeolitic fluid cracking catalysts by spray drying a mixture of (i) hydrous kaolin and/or metakaolin, and (ii) calcined aluminum source, said calcined aluminum source being derived from a pulverized, ultrafine kaolin, calcining the resulting microspheres to convert hydrous kaolin to metakaolin, and reacting microspheres composed of a mixture of metakaolin and calcined aluminum source with an alkaline sodium silicate solution. The weight percent of metakaolin in the calcined microspheres is greater than the calcined aluminum source content.

40 Claims, No Drawings

FLUID CATALYTIC CRACKING CATALYST MANUFACTURING PROCESS

BACKGROUND OF THE INVENTION

This invention relates to improvements in zeolitic fluid cracking catalysts (FCC) produced by an in situ reaction between an alkaline sodium silicate solution and microspheres composed of a mixture of two different forms of calcined kaolin clay, so-called "metakaolin" and "spinel". The former is sometimes referred to as "reactive" calcined kaolin and the latter as "kaolin calcined through the characteristic exotherm".

For many years a significant proportion of commercial FCC catalysts used throughout the world have been made by in situ synthesis from precursor microspheres containing kaolin that has been calcined at different severities prior to formation into microspheres by spray drying. Generally, these fluid cracking catalysts are microspheres composed of zeolite Y and matrix material, typically silica alumina. U.S. Pat. No. 4,493,902 to Brown et al., the teachings of which are incorporated herein by cross-reference, discloses fluid cracking catalysts comprising attrition-resistant, high zeolite content, catalytically active microspheres containing more than about 40%, preferably 50–70% by weight Y faujasite and methods for making such catalysts by crystallizing more than about 40% sodium Y zeolite in porous microspheres composed of a mixture of two different forms of chemically reactive calcined clay, namely, metakaolin (kaolin calcined to undergo a strong endothermic reaction associated with dehydroxylation) and kaolin clay calcined under conditions more severe that those used to convert kaolin to metakaolin, i.e., kaolin clay calcined to undergo the characteristic kaolin exothermic reaction, sometimes referred to as the spinel form of calcined kaolin. In preferred embodiments, the microspheres containing the two forms of calcined kaolin clay are immersed in an alkaline sodium silicate solution, which is heated, preferably until the maximum obtainable amount of Y faujasite is crystallized in the microspheres.

In the practice of the '902 technology, the porous microspheres in which the zeolite is crystallized are preferably prepared by forming an aqueous slurry of powdered raw (hydrated) kaolin clay ($Al_2O_3:2SiO_2:2H_2O$)) and powdered calcined kaolin clay that has undergone the exotherm together with a minor amount of sodium silicate which acts as fluidizing agent for the slurry that is charged to a spray dryer to form microspheres and then functions to provide physical integrity to the components of the spray dried microspheres. The spray dried microspheres containing a mixture of hydrated kaolin clay and kaolin calcined to undergo the exotherm are then calcined under controlled conditions, less severe than those required to cause kaolin to undergo the exotherm, in order to dehydrate the hydrated kaolin clay portion of the microspheres and to effect its conversion into metakaolin, this resulting in microspheres containing the desired mixture of metakaolin, kaolin calcined to undergo the exotherm and sodium silicate binder. In illustrative examples of the '902 patent, about equal weights of hydrated kaolin and spinel are present in the spray dryer feed and the resulting calcined microspheres contain somewhat more kaolin that has undergone the exotherm than metakaolin. The '902 patent teaches that the calcined microspheres comprise about 30–60% by weight metakaolin and about 40–70% by weight kaolin characterized through its characteristic exotherm. It is to be noted that no metakaolin is present in the spray dryer feed used in the preferred manufacturing process described in the '902 patent. A less preferred method described in the patent, involves spray drying a slurry containing a mixture of kaolin clay previously calcined to metakaolin and kaolin calcined to undergo the exotherm but without including any hydrated kaolin in the slurry, thus providing microspheres containing both metakaolin and kaolin calcined to undergo the exotherm directly, without calcining to convert hydrated kaolin to metakaolin. However, the patent teaches that less attrition zeolitized microspheres are produced by this approach.

In carrying out the invention described in the '902 patent, the microspheres composed of kaolin calcined to undergo the exotherm and metakaolin are reacted with a caustic enriched sodium silicate solution in the presence of a crystallization initiator (seeds) to convert silica and alumina in the microspheres into synthetic sodium faujasite (zeolite Y). The microspheres are separated form the sodium silicate mother liquor, ion-exchanged with rare earth, ammonium ions or both to form rare earth or various known stabilized forms of catalysts. The technology of the '902 patent provides means for achieving a desirable and unique combination of high zeolite content associated with high activity, good selectivity and thermal stability, as well as attrition-resistance.

The zeolite content of the crystallized microspheres is determined by X-ray diffraction from the zeolite, which is best performed on the sodium form crystallized microspheres. Conventional chemical analytical techniques are not deemed to be applicable to the determination of the zeolite content of materials in which the zeolite is crystallized in situ in a silica-alumina matrix, which cannot be readily physically or chemically isolated. In practice, it has been found that the apparent amount of zeolite crystallized from any given formulation using the '902 technology can vary, depending on the history of raw material, processing conditions and proportions and concentrations of reagents. The zeolite content (sodium form) of crystallized microspheres range from 40% to 72% in illustrative examples of the '902 patent. Commercial production and laboratory preparations typically result in the crystallization of a maximum of about 55–60% zeolite (sodium form). Since at least a substantial proportion of the zeolite grows in macropores of the precursor porous microspheres, it might be expected that simply increasing macroporosity of the precursor microspheres would result in the generation of higher levels of zeolite because more space would be available in which to grow zeolite crystals.

Surprisingly, merely providing more room for crystal growth by increasing macroporosity will not achieve this result.

The aforementioned technology has met widespread commercial success. Because of the availability of high zeolite content microspheres which are also attrition-resistant, custom designed catalysts are now available to oil refineries with specific performance goals, such as improved activity and/or selectivity without incurring costly mechanical redesigns. A significant portion of the FCC catalysts presently supplied to domestic and foreign oil refiners is based on this technology.

U.S. Pat. No. 5,023,220 to Dight et al. discloses an economically attractive method for increasing the zeolite content of high zeolite content kaolin derived microspheres obtained by reacting precursor microspheres composed of a mixture of metakaolin and kaolin calcined to undergo the exotherm with a sodium silicate solution to crystallize zeolite Y in situ in macropores of the precursor microspheres. The increase in zeolite content is associated with a desirable increase in catalytic activity and seems to improve selectivity. Improvements in activity and selectivity, specifically a reduction in coke and/or gas make are desirable. Reductions in coke or gas make or both serves the needs of refiners whose FCC units are limited by regenerator temperature, air blower and/or gas compressors.

The zeolite microspheres of the invention disclosed in Dight et al. are produced by novel processing, which is a modification of technology described in the '902 patent, and involves increasing the proportion of calcined kaolin in the form of metakaolin to kaolin calcined to undergo the exotherm in the porous precursor microspheres in which zeolite Y is crystallized while also increasing the macroporosity of the precursor microspheres. The increase in macroporosity is preferably achieved by increasing the ratio of calcined kaolin to hydrated kaolin in the slurry that is spray dried to produce the porous precursor microspheres. In this manner, both spatial and nutritional limitations to the growth of zeolite Y are alleviated and therefore ultrahigh levels of zeolite (e.g, ca. 75% able to be crystallized). Known post-zeolite synthesis processing (ion-exchange, etc.) may be practiced to produce octane versions of these catalysts.

U.S. Pat. No. 5,395,809 to Madon et al. found that the proportions of hydrous kaolin and fully calcined kaolin contained in the microsphere prior to in situ zeolite growth will significantly affect the properties and performance of the resulting catalyst. Furthermore, the resulting properties and performance attributes such as coke yield, bottoms upgrading, metals resistance, zeolite stability, activity and ease of sodium removal do not vary linearly with the proportions of hydrous kaolin and fully calcined kaolin. As a result there is a certain range or window where all or most of the desirable properties and performance attributes are at or near optimal. The boundaries of this window are defined by the weight ratio or hydrous to fully calcined kaolin and are approximately 90:10 to 60:40.

The preferred method for making such catalysts in accordance with U.S. Pat. No. 5,395,809 involves initially preparing microspheres composed of combinations of hydrous kaolin and spinel such that the initial hydrous kaolin content, expressed as weight percent, is greater than the spinel content and the microspheres, at this point of the process, are essentially free from metakaolin. The microspheres also contain a binder, usually equal to or greater than 5 wt. % of the spray-dried particles, which is provided by the addition of a sodium silicate solution. The microspheres are calcined at a predetermined temperature to convert the hydrous kaolin to metakaolin without altering the spinel level. In situ Y zeolite FCC catalyst are then made from these microspheres by subsequent crystallization in a seeded sodium silicate solution and ion exchanged to reduce sodium level.

Catalysts of U.S. Pat. No. 5,395,809 have improved stability and are very active and have improved sodium removal with respect to the prior art at that time. The ease of sodium removal and high activity with concurrent low dry gas and coke yields make these modified microsphere catalysts excellent candidates for high octane catalysts, high isobutylene catalysts and improved bottoms upgrading catalysts.

Still, the art is constantly seeking ways to improve zeolite FCC catalysts to improve either one or more of attrition resistance, activity, selectivity, and ease of sodium removal. Such improvement forms the basis of this invention.

SUMMARY OF THE INVENTION

In accordance with this invention, novel zeolite microspheres are produced by crystallizing calcined, spray-dried, microspheres formed from an aqueous slurry containing (i) hydrated kaolin clay, metakaolin or mixtures thereof, (ii) a specifically defined calcined aluminum source and (iii) a binder. The calcined aluminum source (ii) is a kaolin clay which has been calcined through its characteristic exotherm and which itself is derived from a pulverized, ultrafine kaolin clay, or the calcined aluminum source is a calcined aluminum-containing material which has an Incipient Slurry Point of less than 57% solids. The Incipient Slurry Point is defined below and concerns the minimum amount of water needed to form a flowable mass of the calcined aluminum-containing material. The pulverized ultrafine kaolin clay has a particulate size such that 90% weight of the hydrous kaolin particles are less than 2.0 microns.

The calcined aluminum source (ii) contained in the slurry forms the non-zeolite matrix of the catalyst. Utilizing the specified materials for the calcined aluminum source (ii), non-macroporous, in-situ zeolite microspheres are produced in which the matrix is highly dispersed throughout the catalyst instead of being in the form of islands of matrix which occurs when coarser booklet clay particles are used. The zeolite microspheres of this invention have less than 0.07 cc/gm mercury intrusion of pores in the 600–20,000 angstrom range. The zeolite microspheres of this invention have a high surface area and as well, sodium-ammonium equilibrium isotherms are also improved, providing for efficient ion exchange. These advantages are obtained with no loss of selectivity or attrition resistance. These properties are valued in the market served by the zeolite FCC technology.

DETAILED DESCRIPTION OF THE INVENTION

Catalysts of the invention are made from precursor porous microspheres composed of calcined kaolin of which a major weight portion is metakaolin and a minor weight proportion is a calcined aluminum source and a sodium silicate binder. The weight ratio of metakaolin to calcined aluminum source in the precursor microspheres is greater than 1:1, preferably greater than 1.25:1. The level of binder as $SiO_2$ in the microspheres ranges from about 2 to 25 wt. %, preferably 5–17 wt. % based on the weight of the microspheres. The precursor microspheres are reacted with zeolite seeds and an alkaline sodium silicate solution. The micropsheres are crystallized to a desired zeolite content (typically at least 50% and preferably, at least 70%), filtered, washed, ammonium exchanged, exchanged with rare-earth cations if required, calcined, exchanged a second time with ammonium ions, and calcined a second time if required.

The catalyst microspheres of this invention are produced by the general process as disclosed in commonly assigned U.S. Pat. No. 5,395,809. Importantly, the non-zeolitic component (matrix) of the catalysts of the present invention is derived from a specifically defined calcined aluminum source (ii). One such source is a hydrous kaolin that is in the form of an ultrafine powder in which at least 90 wt. % of the particles are less than 2.0 microns, preferably at least 90 wt. % less than 1 micron, and which has been pulverized and calcined through its characteristic exotherm.

Typical prior art zeolite microspheres have a matrix formed from a hydrous kaolin having a larger size than used in this invention and which is calcined at least substantially through its characteristic exotherm. Satintone® No. 1, calcined kaolin (a commercially available kaolin that has been calcined through its characteristic exotherm without any substantial formation of mullite) is a material which has been used on a commercial basis. Satintone® No. 1 is derived from a hydrous kaolin in which 70% of the particles are less than 2 microns. Other sources to form the matrix have been used including finely divided hydrous kaolin (e.g., ASP® 600, a commercially available hydrous kaolin described in Engelhard Technical Bulletin No. TI-1004, entitled "Aluminum Silicate Pigments" (EC-1167)) calcined at least substantially through its characteristic exotherm. Booklet clay has found the most widespread commercial use and has met tremendous success worldwide. Before the present invention, these larger clay particles represented the state of the art and had no perceived deficits.

What is meant by "ultrafine" is that at least 90 wt. % of the particles of the pulverized, hydrous kaolin must be less than 2 microns in diameter, preferably less than 1 micron determined by Sedigraph™ (or sedimentation). It has been found that, in particular, use of hydrous kaolin with this particle size distribution upon pulverization and calcination through the characteristic exotherm results in a microsphere having a greater quantity of macroporosity. The loose packing of the calcined ultrafine kaolin can be likened to a "house of cards" in which the individual particulates are aligned randomly with respect to adjacent particles in a non-parallel manner. Moreover, the calcined, pulverized kaolin exists as porous aggregates of the "house of cards" morphology, providing not only a porous aggregate but additional porous areas between aggregates. Pulverization of the ultrafine hydrous kaolin is required before calcination through the exotherm in order to provide the random stacking of the individual kaolin platelets.

The need to increase the pore volume of the microspheres so as to increase the ultimate zeolite content of the catalysts to levels consistently greater than 50% is disclosed in the above-mentioned U.S. Pat. No. 5,023,220 to Dight et al. The pore volume of the microspheres decreases as the zeolite crystals grow, hence the need for sufficient initial pore volume to yield large zeolite content. Dight et al. increases pore volume by adding metakaolin powder to the microspheres. Metakaolin is more porous than hydrous kaolin. Unfortunately, substantially more water must be used in slurries made from mixtures of metakaolin and kaolin clay that has been calcined through its characteristic exotherm than in slurries made from mixtures of hydrous kaolin and kaolin clay that has been calcined through its characteristic exotherm in order to obtain a slurry that is suitable for spray drying. The reason for this is that slurries made from mixtures of metakaolin and kaolin clay that has been calcined through its characteristic exotherm are, at a given water content, more viscous than slurries made from mixtures of hydrous kaolin and kaolin that has been calcined through its characteristic exotherm. Of course, substantially increasing the amount of water in the slurry that is spray dried increases the amount of water that must be evaporated in the spray drying step and adds to the expense of the spray drying step. Madon et al. discloses in U.S. Pat. No. 5,395,809 the use of coarser hydrous kaolin and high silicate binder levels to improve microsphere porosity. One disadvantage of such process is that the high soda content due to the binder leads to trapping of soda in the microsphere and causes exchange inefficiencies. In the present invention, effective pore volume in the microsphere is obtained by use of the calcined, pulverized ultrafine kaolin which also appears to improve sodium removal.

Kaolin clays or pigments are naturally-occurring hydrated aluminum silicates of the approximate formula $Al_2O_3 \cdot 2SiO_2 \cdot XH_2O$, wherein X is usually 2. Kaolinite, nacrite, dickite and halloysite are species of minerals in the kaolin group. It is well known that when hydrous kaolin is heated in air, that a first transition occurs at about 550° C. associated with an endothermic dehydroxylation reaction. The resulting material is generally referred to as metakaolin. Metakaolin persists until the material is heated to about 975° C. and begins to undergo an exothermic reaction. This material is frequently described as kaolin, which has undergone the characteristic exothermic reaction. Some authorities refer to this material as a defect aluminum-silicon spinel or as a gamma alumina phase. See Donald W. Breck, *Zeolite Molecular Sieves*, published by John Wiley and Sons, 1974, pp. 314–315. On further heating to about 1,050° C., high temperature phases including mullite begin to form. The extent of conversion to mullite is dependent on a time-temperature relationship and the presence of mineralizers, as is well-known in the art.

In the preferred embodiments of this invention, the pulverized, ultrafine hydrous kaolin used as the calcined aluminum source is calcined through its characteristic exotherm with or without the formation of mullite. An especially preferred calcined aluminum matrix source which is used in this invention to form the zeolite microspheres is Ansilex® 93. Ansilex® 93 is made from the fine size fraction of a hard kaolin crude, by spray drying, pulverizing and calcining to prepare low abrasion pigments as described in U.S. Pat. No. 3,586,523, to Fanselow, et. al., the entire contents of which are herein incorporated by reference. The fine fraction of hard kaolin crude is spray dried, pulverized and then calcined beyond the characteristic exotherm. What is unusual about the use of the Ansilex® material is that it is derived from hard kaolin clay. Hard kaolin clays typically have a gray tinge or coloration and are further characterized by breaking into irregularly shaped fragments having rough surfaces. Such hard kaolin clays are also called "gray" clays. Hard kaolin clays also contain a significant iron content, typically from about 0.6 to 1 wt. % of $Fe_2O_3$. Hard kaolin clays are described in Grim's "Applied Clay Mineralogy", 1962, McGraw Hill Book Company, pp. 394–398 thereof, the disclosure of which is incorporated by reference herein. The use of these materials as the calcined aluminum source to form the matrix for in situ FCC microsphere catalysts has not been known previous to commonly assigned, copending application, U.S. Ser. No. 09/667,677 filed Sep.22, 2000. The present application is distinguished from Ser. No. 09/667,677 in that the present invention provides for a substantially non-macroporous catalyst, i.e. a total mercury pore volume of no greater than 0.15 cc/gm.

The use of hard kaolin clays in the incorporated routes to forming zeolite/matrix catalysts is well established. Hard kaolin clays have also occasionally been used as sources of metakaolin for in situ microspheres, but not with advantage. Without wishing to be bound by any theory, it would appear that previous use of the calcined hard kaolin in the in situ matrix art would be precluded by (a) their high iron content and a possibility that this could lead to coke and gas production, and (b) the dilatant nature of their slurries, leading to apparently senseless waste of process time and increased costs in making down high viscosity slurries which spray dry at low solids. We now believe these dilatancy problems and porosity benefits are intrinsically and fundamentally linked. As for the former point, reduced coke and gas was an especially sought-after object for in situ catalysts, since the prior art formulations made coke and gas commensurate with their extraordinarily high level of amorphous matrix activity. This led to lower and lower levels of iron and spinel in subsequent inventions. There now appears to be no relationship between the iron and coke and gas selectivities after all.

The calcined aluminum source useful in this invention can be more generally characterized by the porosity thereof provided during the packing of the calcined material. A test has been developed to determine the pore volume of the calcined aluminum source. The test characterizes the water pore volume of the calcined aluminum source by determining the minimum amount of water needed to make a slurry from a sample of the solids. In the test, a powder sample is mixed with water containing a dispersant such as, for example, Colloid 211, Viking Industries, Atlanta, Ga., in a cup using a stirring rod or spatula. Just enough water is added to the dry sample to convert the dry powder to a single mass of dilatant mud, which only just begins to flow under its own weight. The incipient slurry point (ISP) is calculated from the weights of the sample and water used. This amount of water is larger than the water pore volume of the sample, but is clearly related to the water pore volume. Lower incipient slurry point percent solids values indicate higher water absorption capacities or higher pore volume in the sample. The incipient slurry point can be calculated as follows: ISP=[(grams of dry sample)/(grams of dry sample plus grams of water added)]×100. The units are dimensionless and are reported as percent solids.

The calcined aluminum sources used in this invention will have incipient slurry points of less than 57% solids, preferably 48 to 52% solids. An example of such material is Ansilex® 93 from Engelhard Corporation. Additionally, it has been found that delaminated kaolin, upon pulverization and calcination beyond the characteristic exotherm also has a high water pore volume with an ISP typically below 50% which would be very effective in forming the non-macroporous FCC catalyst microspheres of this invention. This compares with previously used calcined aluminum sources for matrix formation such as Satintone® No. 1 or spinel made from NoKarb booklet kaolin which yield over 58% in the incipient slurry point test.

Accordingly, not only is the pulverized, ultrafine hydrous kaolin useful as the aluminum source, but the aluminum source may also be obtained from delaminated kaolin, platelet alumina and precipitated alumina. Means for delaminating booklets or stacks of kaolin are well-known in the art. Preferred are those methods, which use a particulate grinding medium such as sand, or glass microballoons as is well-known. Subsequent to delamination, the platelets are pulverized to derive the random packing or "house of cards" morphology and then calcined.

The reactive component (i) of the slurry to form the microspheres can be formed of hydrated kaolin or calcined hydrous kaolin (metakaolin) or mixtures thereof. The hydrous kaolin of the feed slurry can suitably be either one or a mixture of ASP® 600 or ASP® 400 kaolin, derived from coarse white kaolin crudes. Finer particle size hydrous kaolins can also be used, including those derived from gray clay deposits, such as LHT pigment. Purified water-processed kaolin clays from Middle Georgia have been used with success. Calcined products of these hydrous kaolins can be used as the metakaolin component of the feed slurry. Silicate for the binder is preferably provided by sodium silicates with $SiO_2$ to $Na_2O$ ratios of from 1.5 to 3.5 and especially preferred ratios of from 2.88 to 3.22.

In a preferred embodiment of the invention an aqueous slurry of finely divided hydrated kaolin clay and/or metakaolin, and pulverized, ultrafine kaolin that has been calcined through its characteristic exotherm and sodium silicate binder is prepared. The aqueous slurry is then spray dried to obtain microspheres comprising a sodium silicate bonded mixture of hydrated kaolin and/or metakaolin and the pulverized, ultrafine kaolin that has been calcined at least substantially through its characteristic exotherm. The microspheres have average particle diameters that are typical of commercial fluid catalytic cracking catalysts, e.g., 65–85 microns. Suitable spray drying conditions are set forth in the '902 patent.

A quantity (e.g., 3 to 30% by weight of the kaolin) of zeolite initiator may also be added to the aqueous slurry before it is spray dried. As used herein, the term "zeolite initiator" shall include any material containing silica and alumina that either allows a zeolite crystallization process that would not occur in the absence of the initiator or shortens significantly the zeolite crystallization process that would occur in the absence of the initiator. Such materials are also known as "zeolite seeds". The zeolite initiator may or may not exhibit detectable crystallinity by x-ray diffraction.

Adding zeolite initiator to the aqueous slurry of kaolin before it is spray dried into microspheres is referred to herein as "internal seeding". Alternatively, zeolite initiator may be mixed with the kaolin microspheres after they are formed and before the commencement of the crystallization process, a technique which is referred to herein as "external seeding".

The zeolite initiator used in the present invention may be provided from a number of sources. For example, the zeolite initiator may comprise recycled fines produced during the crystallization process itself. Other zeolite initiators that may be used include fines produced during the crystallization process of another zeolite product or an amorphous zeolite initiator in a sodium silicate solution. As used herein, "amorphous zeolite initiator" shall mean a zeolite initiator that exhibits no detectable crystallinity by x-ray diffraction.

The seeds may be prepared as disclosed by in U.S. Pat. No. 4,493,902. Especially preferred seeds are disclosed in U.S. Pat. No. 4,631,262.

After spray drying, the microspheres may be calcined directly, or alternatively acid-neutralized to further enhance ion exchange of the catalysts after crystallization. The acid-neutralization process comprises co-feeding uncalcined, spray dried microspheres and mineral acid to a stirred slurry at controlled pH. The rates of addition of solids and acid are adjusted to maintain a pH of about 2 to 7, most preferably from about 2.5 to 4.5 with a target of about 3 pH. The sodium silicate binder is gelled to silica and a soluble sodium salt, which is subseqently filtered and washed free from the microspheres. The silica gel-bound microspheres are then calcined. In either case, calcination is done at a temperature and for a time (e.g., for two hours in a muffle furnace at a chamber temperature of about 1,350° F.) sufficient to convert any hydrated kaolin component of the microspheres to metakaolin, leaving the previously calcined kaolin components of the microspheres essentially unchanged. The resulting calcined porous microspheres comprise a mixture of metakaolin and kaolin clay calcined through its characteristic exotherm in which the two types of calcined kaolin are present in the same microspheres. Most preferably the calcined microspheres comprise metakaolin and kaolin that has been calcined through its characteristic exotherm or, alternatively any appropriate calcined aluminum source as previously described, in a weight ratio of metakaolin to calcined aluminum source of greater than 1:1, preferably greater than 1.25:1. Also present is $Na_2O$ and $SiO_2$ derived from sodium silicate binder.

Y-faujasite is allowed to crystallize by mixing the calcined kaolin microspheres with the appropriate amounts of other constituents (including at least sodium silicate and water), as known in the art, and then heating the resulting slurry to a temperature and for a time (e.g., to 200°–215° F. for 10–24 hours) sufficient to crystallize at least about 50% by weight, preferably at least about 70% by weight, Y-fanjasite in the microspheres. Crystallization of zeolite Y is discussed in aforementioned U.S. Pat. Nos. 5,023,220 and 4,493,902, the entire contents of which are herein incorporated by reference.

The calcined kaolin microspheres are mixed with one or more sources of sodium silicate and water to form a slurry. Sodium hydroxide may be included in the slurry to adjust the $Na_2O$ content in the solution phase to an appropriate level as is known. Zeolite initiator is also added from a source separate from the kaolin if it had not previously been added (e.g. by internal seeding).

The crystallization recipes employed are based on a set of assumptions and certain raw materials. The seeds are described by U.S. Pat. No. 4,631,262 and have been used only externally, recently. The SiO2, Al2O3, and Na2O components of metakaolin, seeds, sodium silicate solution, calcined sodium silicate binder, and silica gel are assumed to be 100% reactive. The alumina and silica in kaolin calcined through the exotherm to the spinel form are assumed to be 1% and 90% reactive respectively. Although these two values are in use, they are not believed to be accurate. The alumina and silica in kaolin calcined through the exotherm to mullite are assumed to be 0% and 67% reactive, respectively. These two values are believed to be accurate, representing the inertness of 3:2 mullite in crystallization and the full solubility of the free silica phase.

Using these assumptions, the following weight ratios for reactive components are used in the overall crystallization recipes. Inert components do not enter into the ratios, except in the case of the seeds dose, which is defined as the ratio of the grams of seeds $Al_2O_3$ to total grams of microspheres.

| Weight Ratios | $SiO_2/Na_2O$ | $SiO_2/Al_2O_3$ | $H_2O/Na_2O$ | Seeds $Al_2O_3/MS$ |
| --- | --- | --- | --- | --- |
| Broadly | 2.50–3.1 | 4.5–15 | 5–15 | .01–0.0001 |
| Preferred | 2.55–2.95 | 5.5–8 | 5.5–8 | 0.006–0.001 |
| Typical | | 7.0 | 7.0 | 0.004 |
| (spinel) | 2.75 | | | |
| (Acid-Neutr) | 2.9 | | | |

The sodium silicate and sodium hydroxide reactants may be added to the crystallization reactor from a variety of sources. For example, the reactants may be provided as an aqueous mixture of N® Brand sodium silicate and sodium hydroxide. As another example, at least part of the sodium silicate may be provided by the mother liquor produced during the crystallization of another zeolite-containing product.

After the crystallization process is terminated, the microspheres containing Y-faujasite are separated from at least a substantial portion of their mother liquor, e.g., by filtration. It may be desirable to wash the microspheres by contacting them with water either during or after the filtration step. The purpose of the washing step is to remove mother liquor that would otherwise be left entrained within the microspheres.

"Silica Retention" may be practiced. The teachings of U.S. Pat. No. 4,493,902 at column 12, lines 3–31, regarding silica retention are incorporated herein by cross-reference.

After crystallization, the microspheres contain crystalline Y-faujasite in the sodium form. In order to obtain a product having acceptable catalytic properties, it is necessary to replace sodium cations in the microspheres with more desirable cations. This may be accomplished by contacting the microspheres with solutions containing ammonium or rare earth cations or both. The ion exchange step or steps are preferably carried out so that the resulting catalyst contains less than about 0.7%, most preferably less than about 0.5% and most preferably less than about 0.4%, by weight $Na_2O$. After ion exchange, the microspheres are dried, preferably by flash drying, to obtain the microspheres of the present invention. In order to make 0 wt. % rare earth (REO) catalysts, the Na+ cations are exchanged by using only an ammonium salt such as $NH_4NO_3$ and without using any rare earth salt during exchange. Such 0 wt. % REO catalysts are especially beneficial as FCC catalysts that give higher octane gasoline and more olefinic product. Rare earth versions of catalysts of this invention, post treated after crystallization by ion-exchange with high levels of rare earth, e.g., by procedures such as described in the '902 patent, are useful when exceptionally high activity is sought and the octane rating of the FCC gasoline produce is not of prime importance. Rare earth levels in the range of 0.1% to 12% usually between 0.5% and 7% (weight basis) are contemplated.

The preferred catalyst of the invention comprises microspheres containing at least 50% and preferably from 70% to 75% by weight Y-faujasite, expressed on the basis of the as-crystallized sodium faujasite form zeolite. As used herein, the term Y-faujasite shall include synthetic faujasite zeolites exhibiting, in the sodium form, an X-ray diffraction pattern of the type described in Breck, Zeolite Molecular Sieves, p. 369, Table 4.90 (1974), and having a crystalline unit cell size, in the sodium form (after washing any crystallization mother liquor from the zeolite), of less than about 24.75 A as determined by the technique described in the ASTM standard method of testing titled "Determination of the Unit Cell Size Dimension of a Faujasite Type Zeolite" (Designation D3942-80) or by an equivalent technique. The term Y-faujasite shall encompass the zeolite in its sodium form as well as in the known modified forms, including, e.g., rare earth and ammonium exchanged forms and stabilized forms. The percentage of Y-faujasite zeolite in the microspheres of the catalyst is determined when the zeolite is in the sodium form (after it has been washed to remove any crystallization mother liquor contained within the microspheres) by the technique described in ASTM standard method of testing titled "Relative Zeolite Diffraction Intensities" (Designation D3906-80) or by an equivalent technique. It is important to equilibrate the microspheres carefully before X-ray evaluations are made since equilibration can have a significant effect on the results.

It is preferred that the Y-faujasite component of the microspheres, in their sodium form, have a crystalline unit cell size of less than about 24.73 A and most preferably less than about 24.69 A. Typically, the Y-faujasite component of the microspheres has a crystalline unit cell size range of between 24.64–24.73 A, corresponding to a $SiO_2/Al_2O_3$ molar ratio of the Y-faujasite of about 4.1–5.2.

The microspheres of the invention may be marketed either in a pure form or blended with other catalysts, additives and/or other blending agents.

The catalysts of the present invention, like all commercial fluid catalytic cracking catalysts, will be hydrothermally deactivated during the operation of the cracking unit. Accordingly, as used herein, the phrase "cracking the petroleum feedstock in the presence of a catalyst" shall include cracking the petroleum feedstock in the presence of the catalyst in its fresh, partially deactivated, or fully deactivated form.

EXAMPLE 1

In this example a microsphere containing 60 parts of coarse white hydrous kaolin (72%<2 um) and 40 parts of Ansilex® 93 spinel from fractionated, pulverized, ultrafine (90%<1 um) gray kaolin was spray dried with 12 parts $SiO_2$ from Grade 40 (Occidental) sodium silicate and then calcined. The microspheres were later crystallized and exchanged to form the catalyst of the invention.

The slurry for spray drying was formed by combining the hydrous kaolin stream with the spinel powder. Water was added to control the combined slurry solids to 50%. The slurry was fed to a spray dryer with a wheel atomizer, where the sodium silicate solution (2.88 SiO2Na2O) was injected into the slurry at an in-line static mixer a few feet upstream of the atomizer. The mix was spray dried and then rotary calcined until the X-ray diffraction line for hydrous kaolin was eliminated, indicating conversion of hydrous kaolin to metakaolin.

These microspheres were subsequently crystallized at about 210 deg. F. by conventional methods to yield zeolite Y. The following Table 1 lists the crystallization recipe utilized in this example.

TABLE 1

| | |
|---|---|
| SiO2/Na2O, w/w | 2.74 |
| SiO2/Al2O3, w/w | 6 |
| H2O/Na2O, w/w | 6.39 |
| Seeds, w/w | 0.004 |
| Microsphere gms | 250 |
| 30% Sodium Disilicate, gms | 989.8 |
| 19% NaOH, gms | 17.8 |
| H2O, gms | 2.3 |
| Hours | 20 |

After crystallization the mother liquor was removed from the catalyst and then the catalyst was washed with water. The material was then ion exchanged with ammonium nitrate as detailed in the other examples. Rare earth was added to the catalyst. The catalyst was calcined and then further ion exchanged until a nominal 0.4% $Na_2O$ was obtained. The catalyst was then calcined a second time to finished product. The properties of the catalyst were compared with the properties of rare earthed exchanged commercial catalysts prepared in accordance with U.S. Pat. No. 5,395,809. Results are shown in Table 2.

TABLE 2

| Comparative Catalyst (5,395,809) Data at 1.1% REO | | | |
|---|---|---|---|
| | Sodium Form | Finished Product | Steamed 4 Hrs. @ 1500 F. |
| TSA | 506 | 373 | 230 |
| MSA | 56 | 121 | 81 |
| ZSA | 450 | 252 | 149 |
| Z/M | 8.04 | 2.08 | 1.84 |
| UCS | | 24.48 | 24.26 |
| ABD | | 0.86 | 0.86 |

| Comparative Catalyst (5,395,809) at 3.1% REO. | | | |
|---|---|---|---|
| | Sodium Form | Finished Product | Steamed Properties 4 Hrs. @ 1500 F. |
| TSA | 506 | 407 | 244 |
| MSA | 56 | 116 | 77 |
| ZSA | 450 | 291 | 67 |
| Z/M | 8.04 | 2.51 | 2.17 |
| UCS | | 24.52 | 24.292 |
| ABD | | 0.83 | 0.85 |

| Invention at 1.5% REO | | | |
|---|---|---|---|
| | Sodium Form | Finished Product | Steamed Properties 4 Hrs. @ 1500 F. |
| TSA | 564 | 432 | 272 |
| MSA | 75 | 132 | 95 |
| ZSA | 489 | 300 | 177 |
| Z/M | 6.52 | 2.27 | 1.86 |
| UCS | | 24.459 | 24.26 |
| ABD | | 0.83 | 0.83 |

| Invention at 3.1% REO | | | |
|---|---|---|---|
| | Sodium Form | Fresh | 4 Hrs. @ 1500 |
| TSA | 564 | 443 | 271 |
| MSA | 75 | 126 | 93 |
| ZSA | 489 | 317 | 178 |
| Z/M | 6.52 | 2.52 | 1.91 |
| UCS | | 24.528 | 24.273 |
| ABD | | 0.8 | 0.82 |

EXAMPLE 2

The comparative and inventive (3% REO) samples of Example 1 were tested as cracking catalysts. The samples steamed at 1500 F. for four hours were blended with activity-adjusting kaolin microspheres to give a BET surface area of 130 $m^2/gm$. These blends were used in an ACE™ (Xytel) microscale FFB reactor with a 2.125" injector, 8 WHSV, varying time on stream, 980° F., and a gas oil whose properties are listed in Table 3. The selectivities, calculated at constant coke, are not meaningfully different between the Invention and the prior art commercial catalysts, see Table 4. The steamed surface areas and sodium removal results were improved, however.

TABLE 3

| Gas Oil Properties | |
|---|---|
| Concarbon | 0.36 |
| API @ 60 F. | 24.29 |
| Pour Point (F.) | 97 |
| Aniline Pt. (F.) | 189 |
| Basic N ppm | 355 |
| Total N ppm | 986 |
| Ref. Index @ 25 C. | 1.505 |
| Sulfur % | 0.72 |
| UOP Kw | 11.92 |
| Simulated Distillation (F.) | |
| 10% | 633 |
| 30% | 731 |
| 50% | 808 |
| 70% | 887 |
| 90% | 980 |

TABLE 4

| Catalyst | Comparative | Invention |
|---|---|---|
| Rare Earth Content | 3% REO | 3% REO |
| H2, Wt % | 0.07 | 0.08 |
| Total C2-, Wt % | 1.67 | 1.67 |
| LPG, Wt % | 19.43 | 19.75 |
| Gasoline, Wt % | 49.61 | 50.04 |

TABLE 4-continued

| Catalyst | Comparative | Invention |
|---|---|---|
| LCO, Wt % | 15.93 | 16.10 |
| HCO, Wt % | 9.81 | 8.90 |
| Coke, Wt % | 3.54 | 3.54 |
| Total | 100.00 | 100.00 |
| C3 = /Total C3s | 0.83 | 0.84 |
| i − C4 = /C4 = | 0.22 | 0.24 |
| C4 = /Total C4s | 0.54 | 0.55 |
| Conversion | 74.26 | 75.00 |
| Cat/Oil | 6.44 | 7.45 |

EXAMPLE 3

In this example a microsphere containing about 67 parts of Metamax™ metakaolin and 33 parts of Ansilex® 93 spinel pigment from ultrafine (90%<1 um) gray kaolin was spray dried with 11.7 parts of SiO2 from N-Brand® sodium silicate, acid-neutralized and then calcined. The microspheres were later crystallized and exchanged to form the catalyst of the invention.

The slurry that was spray dried was formed by mixing 2.2 kg of A-93 HS, a 60% solids aqueous slurry of Ansilex 93® high brightness pigment available from Engelhard Corporation, and 4.87 kg of Metamax™ metakaolin at about 55% solids. Metamax is available as a dry powder, also from the Engelhard Corporation. The Metamax was made down with 0.9 ml of Colloid 211 dispersant per kg of dry Metamax. The slurry was fed to a single fluid nozzle spray dryer, where N-brand® sodium silicate solution (3.22 SiO2/Na2O) was injected into the slurry at an in-line static mixer a few feet upstream of the nozzle.

The spray-dried microspheres were collected and acid-neutralized as follows. 3.6 Kg of water was placed in a bucket equipped with a stirrer and a pH probe. 1.8 Kg of microspheres and 199 grams of 40% H2SO4 were slowly co-fed to the stirred water at room temperature and pH=3–4 to form silica gel and sodium sulfate. The microspheres were then filtered, washed with de-ionized water, dried, and then calcined at 1350° F. for 3 hours.

EXAMPLE 4

In this example a microsphere containing 67 parts of Metamax™ metakaolin and 33 parts of Hi-opaque™ spinel pigment, ISP less than 57% solids, made from a standard particle size fraction of delaminated coarse white kaolin, was spray dried with 8.46 parts of SiO2 from N-Brand® sodium silicate, and then calcined directly. The microspheres were later crystallized and exchanged to form the catalyst of the invention.

The slurry that was spray dried was formed by mixing 2.2 kg of slurry of Hi-opaque™ (Engelhard) made down with Colloid 211 and water at 60% solids, and 4.87 kg of 55% solids aqueous slurry of Metamax™ metakaolin. These pigments were made down separately, using about 2.5 and 3.8 ml of Colloid 211 dispersant per kg of dry pigment and considerable mechanical work in Cowles mixers. The slurries were initially dilatant, and mixing was continued until the dilatancy was no longer apparent at the walls of the containers. The combined slurry was spray dried as in Example 3 with N-brand® injection. The spray dried microspheres were collected and calcined directly at 1500° F. for 4 hours.

EXAMPLE 5

In this example a microsphere containing 67 parts of Metamax™ metakaolin and 33 parts of spinel made from a coarse particle size fraction of delaminated coarse white kaolin (Nusurf™), having an ISP of less than 57% solids, was spray dried with 5.20 parts of SiO2 from N-Brand® sodium silicate, and then calcined directly. The microspheres were later crystallized and exchanged to form the catalyst of the invention.

Nusurf™ hydrous delaminated kaolin pigment (Engelhard) was calcined in a pilot scale electrically heated rotary calciner at about 13 minutes residence time and 1850° F. zone temperatures. The calcined product was then hammer milled and fluid energy milled to de-agglomerate the particles larger than 20 um. The slurry that was spray dried was formed by mixing 2.2 kg of Nusurf™ spinel made down with Colloid 211 and water at 60% solids, and 4.87 kg of 55% solids aqueous slurry of Metamax™ metakaolin. These pigments were made down separately, using about 3.8 ml each of Colloid 211 dispersant per kg of dry pigment and considerable mechanical work in Cowles mixers. The slurries were initially dilatant, and mixing was continued until the dilatancy was no longer apparent at the walls of the containers. The combined slurry was spray dried as in Example 1 with N-brand® injection. The spray dried microspheres were collected and calcined directly at 1500° F. for about 4 hours.

EXAMPLES 6–8

The microspheres of Examples 3–5 were crystallized at about 210° F. by conventional methods to yield zeolite Y. Two good crystallizations were combined together in each case. Table 5 lists the recipe for one of the two equivalent runs. Seeds contain 0.57 Wt % Al2O3, 13.9 Wt % Na2O, 23.75% SiO2, with the balance water.

TABLE 5

| Microsphere of | Example 6 Example 3 | Example 7 Example 4 | Example 8 Example 5 |
|---|---|---|---|
| SiO2/Na2O, w/w | 2.81 | 2.85 | 2.75 |
| H2O/Na2O, w/w | 5.9 | 7.5 | 7.5 |
| Seeds, w/w | 0.004 | 0.004 | 0.004 |
| Microsphere gms | 150 | 300 | 300 |
| Seeds, gms | 105.3 | 210.5 | 210.5 |
| N-brand, gms | 666 | 1434 | 1548 |
| 50% NaOH, gms | 87.0 | 141.8 | 171.9 |
| H2O, gms | 103.6 | 542 | 594 |
| Hours | 23 | 23 | 23 |

After crystallization, the samples were washed and then exchanged twice with 54 Wt % ammonium nitrate, equal parts of catalyst, solution, and water being used at 180° F. and pH of 3. Following this the samples were exchanged to give 3 Wt % REO, calcined at 1150° F. with 25% moisture in a covered tray, exchanged five times with ammonium nitrate as above, and calcined again at 1150° F. as above to give the finished products. Steam stability was assessed using a four hour 1500° F. steaming at 1 Atm steam pressure. Selected properties appear below in Table 6, along with typical results for the prior art in practice.

TABLE 6

| Catalyst of<br>Microsphere of | Example 6<br>Example 3 | Example 7<br>Example 4 | Example 8<br>Example 5 | Comparative<br>5,395,809 |
|---|---|---|---|---|
| As Sprayed ABD | 0.55 | 0.57 | 0.57 | |
| Na-form ZSA | 512 | 512 | 473 | |
| Na-form % ZY | 78 | 78 | 72 | |
| Finished product properties | | | | |
| BET, m2/gm | 487 | 452 | 442 | 421 |
| HgPV, cc/gm, at 40–200 A | 0.147 | 0.063 | 0.069 | 0.078 |
| 200–2K | 0.031 | 0.007 | 0.012 | 0.029 |
| 2K–20K | 0.008 | 0.009 | 0.023 | 0.019 |
| TPV, 40–20,000 A Diam | 0.186 | 0.08 | 0.104 | 0.125 |
| Na2O, Wt % | 0.09 | 0.28 | 0.16 | 0.38 |
| REO, Wt % | 2.9 | 2.9 | 2.9 | 3.26 |
| 1500 F Steamed ZSA | 271 | 244 | 234 | 161 |
| % ZSA Maintenance vs. Na-form | 56% | 51% | 51% | 38–40% |

The results show that low finished product sodium levels, high finished surface areas, and improved zeolite surface area stability has been obtained using the invention. The products are substantially non-macroporous.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A non-macroporous zeolitic fluid catalytic cracking catalyst produced by the steps comprising:
   (a) forming an aqueous slurry containing (i) hydrated kaolin clay, metakaolin or mixture thereof, (ii) kaolin clay that has been calcined through its characteristic exotherm and (iii) binder, said kaolin clay calcined through its characteristic exotherm being derived from a pulverized, ultrafine kaolin wherein 90 wt. % of said ultrafine kaolin is in particles having a diameter of less than 2 microns;
   (b) spray drying the aqueous slurry to obtain microspheres;
   (c) calcining the microspheres obtained in step (b) at a temperature and for a time sufficient to convert hydrated kaolin clay in microspheres substantially to metakaolin, but insufficient to cause metakaolin or hydrated kaolin to undergo the characteristic kaolin exotherm and to provide microspheres of calcined kaolin having a ratio of metakaolin to kaolin calcined through the exotherm in excess of 1:1;
   (d) mixing microspheres obtained in step (c) with sodium silicate and water to obtain an alkaline slurry;
   (e) heating the slurry of microspheres of calcined clay to a temperature and for a time sufficient to crystallize at least about 50% by weight Y-faujasite in the microspheres.

2. The catalyst of claim 1 wherein said slurry in step (a) contains (i) hydrous kaolin.

3. The catalyst of claim 2 wherein said slurry in step (a) comprises from (i) 55 to 85 parts by weight hydrated kaolin clay and (ii) 15 to 45 parts by weight kaolin clay that has been calcined through its characteristic exotherm.

4. The catalyst of claim 1 wherein said slurry in step (a) contains (i) metakaolin.

5. The catalyst of claim 4 wherein said slurry in step (a) comprises (i) 55 to 85 parts by weight metakaolin and (ii) about 15 to 45 parts by weight kaolin calcined through its characteristic exotherm.

6. The catalyst of claim 1 wherein said microspheres of calcined kaolin in step (c) has a ratio of metakaolin to kaolin calcined through the characteristic exotherm in excess of 1.25:1.

7. The catalyst of claim 1 in which said binder is a sodium silicate solution.

8. The catalyst of claim 7 in which the binder level as $SiO_2$ is between about 2 to 25 wt. % of the microspheres in step (b).

9. The catalyst of claim 7 in which the binder level as $SiO_2$ is between about 4 to 17 wt. % of the microspheres in step (b).

10. The catalyst of claim 1 wherein 90 wt. % of said ultrafine kaolin is in particles having a diameter of less than 1 micron.

11. The catalyst of claim 1 wherein said Y-faujasite is in the sodium form.

12. The catalyst of claim 11 wherein at least a portion of said sodium is ion-exchanged with rare earth cations.

13. The catalyst of claim 1 wherein said calcined, ultrafine kaolin has an incipient slurry point of less than 57% solids.

14. The catalyst of claim 13 wherein said calcined ultrafine kaolin has an incipient slurry point of no greater than 52% solids.

15. The catalyst of claim 1 wherein said Y faujasite is present in amount of at least 65% by weight of said microspheres.

16. The catalyst of claim 1 wherein said microspheres from step (c) are provided with a ratio of metakaolin to kaolin calcined through the exotherm in excess of 2:1.

17. A method of cracking a gas oil comprising contacting said gas oil with a fluidized catalyst of claim 1.

18. A non-macroporous zeolitic fluid catalytic cracking catalyst produced by the steps comprising:
   (a) forming a aqueous slurry containing (i) hydrated kaolin clay, metakaolin or mixtures thereof, (ii) a calcined aluminum source and (iii) binder, said calcined aluminum source having an incipient slurry point of less than 57% solids;
   (b) spray drying the aqueous slurry to obtain microspheres;
   (c) calcining the microspheres obtained in step (b) at a temperature and for a time more sufficient to convert hydrated kaolin clay in the microspheres substantially to metakaolin, but insufficient to cause metakaolin or hydrated kaolin to undergo the characteristic kaolin exotherm and to provide microspheres of calcined kaolin having a ratio of metakaolin to calcined aluminum source in excess of 1:1;
   (d) mixing the microspheres obtained in step (c) with sodium silicate and water to obtain alkaline slurry;
   (e) heating the slurry of microspheres of calcined kaolin to a temperature and for a time sufficient to crystallize at least about 50% by weight Y-faujasite in the microspheres.

19. The catalyst of claim 18 wherein said slurry in step (a) comprises from (i) 55 to 85 parts by weight hydrated kaolin clay and (ii) 15 to 45 parts by weight calcined aluminum source.

20. The catalyst of claim 18 wherein said slurry in step (a) comprises (i) 55 to 85 parts by weight metakaolin and (ii) about 15 to 45 parts by weight calcined aluminum source.

21. The catalyst of claim 18 wherein said Y-faujasite is in the sodium form.

22. The catalyst of claim 21 wherein at least a portion of said sodium is ion-exchanged with rare earth cations.

23. The catalyst of claim 18 herein said calcined aluminum source has an incipient slurry point of no greater than 52% solids.

24. The catalyst of claim 18 wherein said Y faujasite is present in amount of at least 65% by weight of said microspheres.

25. The catalyst of claim 18 wherein said microspheres from step (c) are provided with a ratio of metakaolin to calcined aluminum source in excess of 2:1.

26. A method of cracking a gas oil comprising contacting said gas oil with a fluidized catalyst of claim 18.

27. A method of making a high zeolite content, non-macroporous fluid catalytic cracking catalyst comprising the steps of:

(a) forming an aqueous slurry containing (i) hydrated kaolin clay, metakaolin or mixtures thereof, (ii) a calcined aluminum source, (iii) sodium silicate binder, said calcined aluminum source having an incipient slurry point of less than 57% solids;

(b) spray drying the aqueous slurry to obtain microspheres;

(c) calcining the microspheres obtained in step (b) at a temperature and for a time sufficient to convert hydrated kaolin clay in the microspheres substantially to metakaolin, but insufficient to cause metakaolin or hydrated kaolin to undergo the characteristic kaolin exotherm and to provide microspheres of calcined kaolin having a ratio of metakaolin to calcined aluminumsource of greater than 1:1;

(d) mixing the microspheres obtained in step (c) with sodium silicate and water to obtain an alkaline slurry;

(e) heating the slurry of microspheres of calcined kaolin to a temperature and for a time sufficient to crystallize at least about 50% by weight Y-faujasite in the microspheres.

28. The method of claim 27 wherein at least 65% by weight Y-faujasite is crystallized in the microspheres in step (e).

29. The method of claim 28 wherein at least 70% by weight Y-faujasite is crystallized in the microsphere in step (e).

30. The method of claim 27 wherein said Y-faujasite is in the sodium form.

31. The method of claim 30 including the steps of:

(f) separating the microspheres containing at least 50% by weight Y-faujasite from at least a major portion of its mother liquor;

(g) replacing sodium cations in the microspheres separated in step (e) with ammonium ions or ammonium ions and thereafter rare earth ions;

(h) calcining the microspheres from step (g) to facilitate release of sodium ions; and (i) further exchanging the microspheres with ammonium ions to reduce $Na_2O$ content to below 1%.

32. The method of claim 31 in which the rare earth content expressed as rare earth oxide, REO, is between 0.1 wt. % and 12 wt. %.

33. The method of claim 31 in which the rare earth content expressed as rare earth oxide, REO, is between 0.5% wt. % and 7 wt. %.

34. The method of claim 31 in which the sodium content expressed as $Na_2O$ is reduced to a level up to 0.35 wt. %.

35. The method of claim 30 comprising replacing sodium cations in the microspheres with ammonium ions and thereafter rare earth ions.

36. The method of claim 27 wherein said calcined aluminum source is kaolin clay calcined through the characteristic exotherm, said kaolin clay calcined through the characteristic exotherm being derived from a pulverized ultrafine kaolin wherein 90 wt. % of said ultrafine kaolin is in particles having a diameter of less than 2 microns.

37. The method of claim 36 wherein 90% of said ultrafine kaolin is in particles having a diameter of less than 1 micron.

38. The method of claim 36 wherein said kaolin calcined through said exotherm is derived from a gray clay containing about 0.6 to 1.0 wt. % iron oxide.

39. The method of claim 27 wherein said alkaline slurry of step (d) contains sodium hydroxide.

40. The catalyst of claim 27 wherein said microspheres from step (c) are provided with a ratio of metakaolin to calcined aluminum source in excess of 2:1.

* * * * *